No. 717,962. PATENTED JAN. 6, 1903.
G. A. BABBITT.
WAGON LOADING APPARATUS.
APPLICATION FILED OCT. 9, 1902.
NO MODEL.
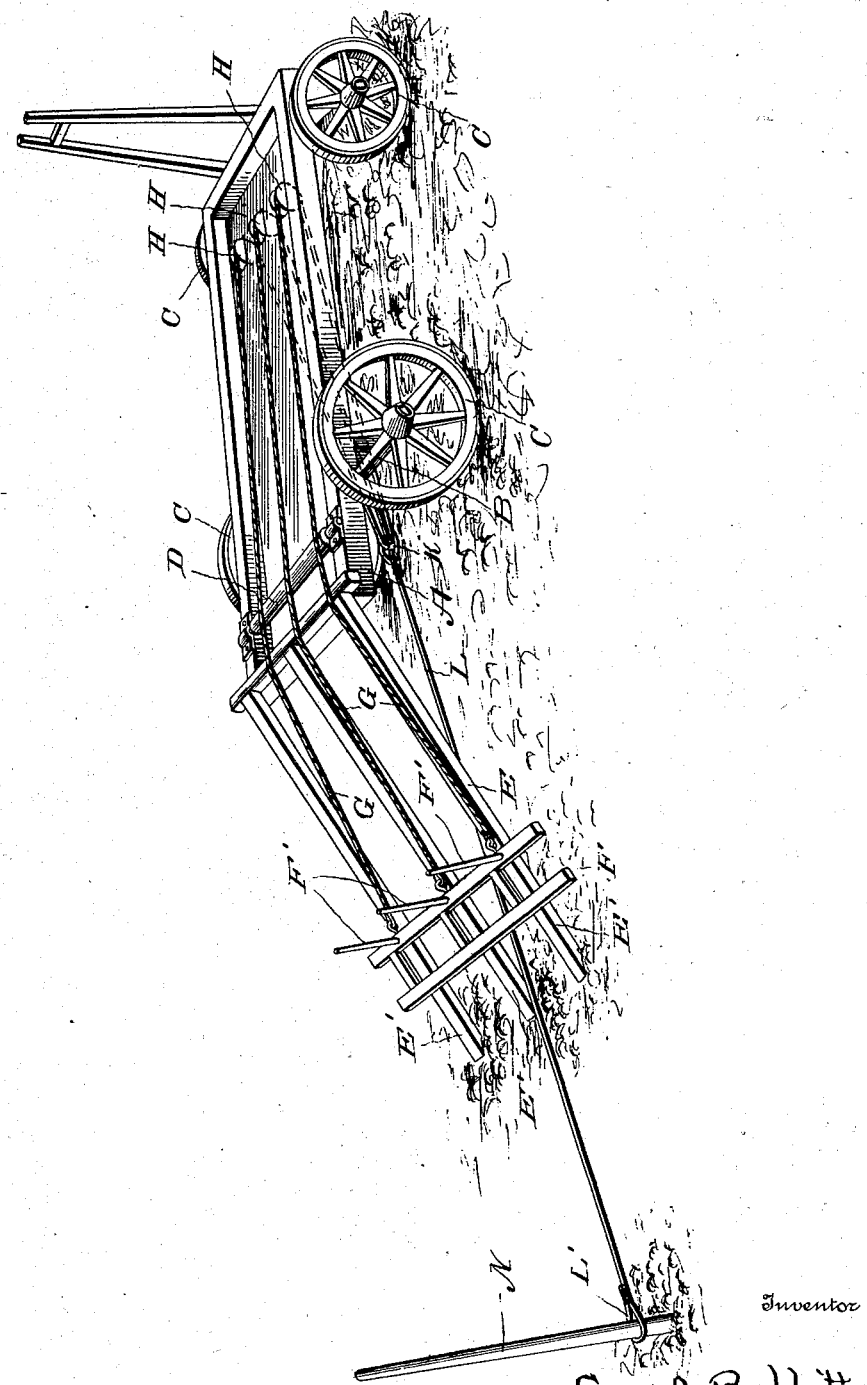
Witnesses
R. A. Boswell
A. L. Hough
Inventor
Geo. A. Babbitt
By Franklin N. Hough
Attorney

UNITED STATES PATENT OFFICE.

GEORGE A. BABBITT, OF BROWNSBORO, KENTUCKY.

WAGON-LOADING APPARATUS.

SPECIFICATION forming part of Letters Patent No. 717,962, dated January 6, 1903.

Application filed October 9, 1902. Serial No. 126,577. (No model.)

*To all whom it may concern:*

Be it known that I, GEORGE A. BABBITT, a citizen of the United States, residing at Brownsboro, in the county of Oldham and State of Kentucky, have invented certain new and useful Improvements in Wagon-Loading Apparatus; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in wagon-loading apparatus, and especially to means for loading corn or other products; and it consists in hoisting mechanism comprising a rack which is adapted to travel up an inclined way and having cables secured to the rack and passing over suitable rollers or pulleys and connected to a rope or cable which is anchored, the load being hoisted as the wagon is driven forward.

The invention consists, further, in various details of construction and combinations of parts, which will be hereinafter fully described and then specifically defined in the appended claim and illustrated in the accompanying drawing, in which I have shown a perspective view of my improved wagon-loading apparatus.

Reference now being had to the details of the drawing by letter, A designates the platform of a wagon, mounted on suitable axles B, to which are journaled wheels C. Mounted in suitable bearings in the platform of the wagon is a roller D, or, if desired, a plurality of rollers may be positioned at different positions along the wagon in order to lessen the friction between the various parts of the apparatus. At a location preferably in the rear end of the platform of the wagon is an inclined way E, made up of pieces E', the lower ends of which are adapted to rest and drag upon the ground as the wagon is driven forward. Mounted to travel upon said inclined way is a rack F, which in the present instance is constructed of two parallel pieces on the forward of which are stakes F', provided to hold the corn or other product which it is desired to load upon the wagon. Connected to said rack are the ropes G, which pass over the roller D, thence forward over the surface of of the platform of the wagon and over the pulleys H, which are mounted in apertures in the platform of the wagon. In the drawing I have illustrated three of these pulleys located at suitable intervals apart, although any number may be used, and they may be positioned at various locations. Said ropes G, which pass over the pulleys H, are brought together and secured to a ring K underneath the platform of the wagon, and to said ring is connected a rope L, which extends rearwardly and has a loop L' formed in one end thereof, which loop is adapted to be caught over an anchorage-post N. This post may be a crowbar or stake, which may be temporarily driven into the ground or which may be held in an upright position by means of an operator as the wagon is driven forward for the purpose of causing the rack to hoist the load of corn or other product upon the wagon.

In operation the corn is placed upon the inclined way, the rack being below the position on which the corn is placed and serving as a stop to prevent the same falling by gravity off said way. After a suitable quantity has been placed upon the inclined way the wagon is started, and as the end of the rope L is anchored to the post N it will be observed that as the wagon advances the rack will be drawn by the ropes L and G up over the platform of the wagon. The first installment of material to be loaded may be drawn to the forward part of the platform of the wagon, and when it is desired to return the rack to receive a second installment of material the operator may pull out the stake N and drive the same into the ground in a new position, and the operation may be repeated until the wagon is loaded.

Having thus fully described my invention, what I claim as new, and desire to secure by Letters Patent, is—

An apparatus for loading wagons comprising, in combination with the platform of a wagon, a roller and pulleys journaled thereon, an inclined way secured to the rear end of the platform, a rack mounted on said inclined way, pins rising from said rack, ropes secured to the rack and passing over said roller and pulleys, an anchor-post, a rope connected at one end to said anchor and at its other end connected to the ropes passing over said pulleys, as set forth.

In testimony whereof I hereunto affix my signature in presence of two witnesses.

GEORGE A. BABBITT.

Witnesses:
M. T. HAMS,
JAMES FOX.